(12) United States Patent
Tanaka

(10) Patent No.: US 10,136,012 B2
(45) Date of Patent: Nov. 20, 2018

(54) IMAGE READING APPARATUS EQUIPPED WITH AUTOMATIC DOCUMENT FEEDER AND IMAGE FORMING APPARATUS HAVING A BLANK-PAGE DETERMINATION FEATURE

(71) Applicant: CANON KABUSHIKI KAISHA, Tokyo (JP)

(72) Inventor: Shigeto Tanaka, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/385,199

(22) Filed: Dec. 20, 2016

(65) Prior Publication Data

US 2017/0180580 A1    Jun. 22, 2017

(30) Foreign Application Priority Data

Dec. 21, 2015  (JP) .................................. 2015-248350

(51) Int. Cl.
*H04N 1/00* (2006.01)
*H04N 1/407* (2006.01)
*H04N 1/409* (2006.01)

(52) U.S. Cl.
CPC ....... *H04N 1/00803* (2013.01); *H04N 1/0032* (2013.01); *H04N 1/00909* (2013.01); *H04N 1/00925* (2013.01); *H04N 1/4074* (2013.01); *H04N 1/4097* (2013.01); *H04N 2201/0081* (2013.01)

(58) Field of Classification Search
CPC ......... H04N 1/00798–1/00824; H04N 1/0032; H04N 1/00909; H04N 1/00925; H04N 1/407–1/4097
See application file for complete search history.

(56) References Cited

U.S. PATENT DOCUMENTS 8,320,029 B2 * 11/2012 Kamei ............... H04N 1/00002
358/483
8,520,271 B2 * 8/2013 Nishio ................ G03G 15/607
358/474

(Continued)

FOREIGN PATENT DOCUMENTS

JP         2006165980 A      6/2006

*Primary Examiner* — Scott A Rogers
(74) *Attorney, Agent, or Firm* — Rossi, Kimms & McDowell LLP

(57) ABSTRACT

An image reading apparatus that is capable of determining whether an original is a blank-paper original without stopping a reading operation. A feeding unit feeds an original to a read position. A read unit is equipped with a plurality of line sensors that read the original at the read position. An obtaining unit obtains dust-position information about dust adhering to the read position based on image information that is obtained by reading a guide member arranged corresponding to the read position with the read unit before reading the original. A determination unit determines whether the original is a blank-paper original using image information corresponding to pixels without being affected by the dust that is obtained by excluding image information corresponding to the dust-position information from image information read by the line sensors of the read unit.

10 Claims, 13 Drawing Sheets

(56) References Cited

U.S. PATENT DOCUMENTS

| | | | | |
|---|---|---|---|---|
| 8,587,834 B2* | 11/2013 | Shimokawa | .......... | H04N 1/401 |
| | | | | 358/2.1 |
| 8,587,835 B2* | 11/2013 | Sato | .................. | H04N 1/00803 |
| | | | | 358/1.18 |
| 9,237,256 B2* | 1/2016 | Tanaka | ................. | H04N 1/4097 |
| 9,444,954 B2* | 9/2016 | Muraishi | ............ | H04N 1/00411 |
| 2005/0179954 A1* | 8/2005 | Arai | .................. | H04N 1/00002 |
| | | | | 358/3.26 |
| 2011/0149357 A1* | 6/2011 | Utsunomiya | ........ | H04N 1/4097 |
| | | | | 358/475 |
| 2011/0181919 A1* | 7/2011 | Okutsu | ............. | H04N 1/40068 |
| | | | | 358/448 |
| 2014/0320934 A1* | 10/2014 | Muraishi | ................ | H04N 1/38 |
| | | | | 358/453 |
| 2015/0288838 A1* | 10/2015 | Tanaka | ............... | H04N 1/00742 |
| | | | | 358/474 |

* cited by examiner

IMAGE READING APPARATUS EQUIPPED WITH AUTOMATIC DOCUMENT FEEDER AND IMAGE FORMING APPARATUS HAVING A BLANK-PAGE DETERMINATION FEATURE

BACKGROUND OF THE INVENTION

Field of the Invention

The present invention relates to an image reading apparatus that is provided with an automatic document feeder, and to an image forming apparatus equipped with the image reading apparatus.

Description of the Related Art

There is a known conventional image reading apparatus that reads an original image at a read position on a read glass while conveying originals stacked on an original tray one by one by an automatic document feeder (ADF). Such an image reading apparatus irradiates an original with light emitted from a light source when the original conveyed one by one by the ADF passes the reading position, and read the original by receiving reflected light from the original with an image pickup device like a CCD.

When an original is conveyed by the ADF, paper powder or toner sticking to the original may peel off and adhere to the read position on the read glass. When an original image is read in a state where dust, such as paper powder or toner, adheres to the read glass, a vertical streak appears in the read image at the position corresponding to the dust adhesion position because the dust obstructs light with which the original is irradiated.

Moreover, when a copying operation is performed in a state where a plurality of originals that are stacked by a user contain a blank-paper original, a copy of the blank-paper original will be formed by an image forming apparatus. In order to solve such a problem, an image forming apparatus that is provided with a blank-paper-detection function that determines whether an original is a blank-paper original at a time when an image reading apparatus reads the original is developed.

Incidentally, if it is determined whether an original is a blank-paper original in a state where a vertical streak appears in a read image due to dust adhering to an original reading position, the vertical streak may be determined as a print content. If the vertical streak is erroneously determined as a print content, the copying operation will be performed as-is for the blank-paper original. This wastes a copy paper sheet.

Thus there is a proposed apparatus that stops a reading operation or a copying operation and warns with a display unit, a voice message, etc. when dust adheres to an original reading position on a read glass. The apparatus restarts the operation only when the dust is removed by a user or a serviceman. See Japanese Laid-Open Patent Publication (Kokai) No. 2006-165980 (JP 2006-165980A). Since this apparatus stops the copying operation when dust adheres, the inconvenience that the copying operation is performed for a blank-paper original because the vertical streak is erroneously detected as the print content is canceled.

However, whenever dust adheres to the image reading position on the read glass, it is necessary to interrupt the reading operation or the copying operation and to clean according to the technique of the above-mentioned publication. Moreover, when a plurality of sheets, such as recycled paper sheet, of which particles of paper fiber are large and easily peel are conveyed, paper powder adheres to the read glass frequently. In such a case, it is necessary to clean the read glass frequently, which causes a problem that the image reading operation or the copying operation is interrupted on each occasion.

SUMMARY OF THE INVENTION

The present invention provides an image reading apparatus and image forming apparatus that are capable of determining whether an original is a blank-paper original without stopping a reading operation.

Accordingly, a first aspect of the present invention provides an image reading apparatus comprising a feeding unit configured to feed an original to a read position, a read unit configured to be equipped with a plurality of line sensors that read the original at the read position, an obtaining unit configured to obtain dust-position information about dust adhering to the read position based on image information that is obtained by reading a guide member arranged corresponding to the read position with the read unit before reading the original, and a determination unit configured to determine whether the original is a blank-paper original using image information corresponding to pixels without being affected by the dust that is obtained by excluding image information corresponding to the dust-position information from image information read by the line sensors of the read unit.

Accordingly, a second aspect of the present invention provides an image forming apparatus equipped with the image reading apparatus according to the first aspect.

According to the present invention, since the determination unit, which determines whether an original is a blank-paper original on the basis of the image information about the pixels corresponding to the position to which dust does not adhere, is provided, the problem that the dust streak is erroneously detected as the print content is avoided, and the determination about whether an original is a blank-paper original is performed without stopping the image read operation.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
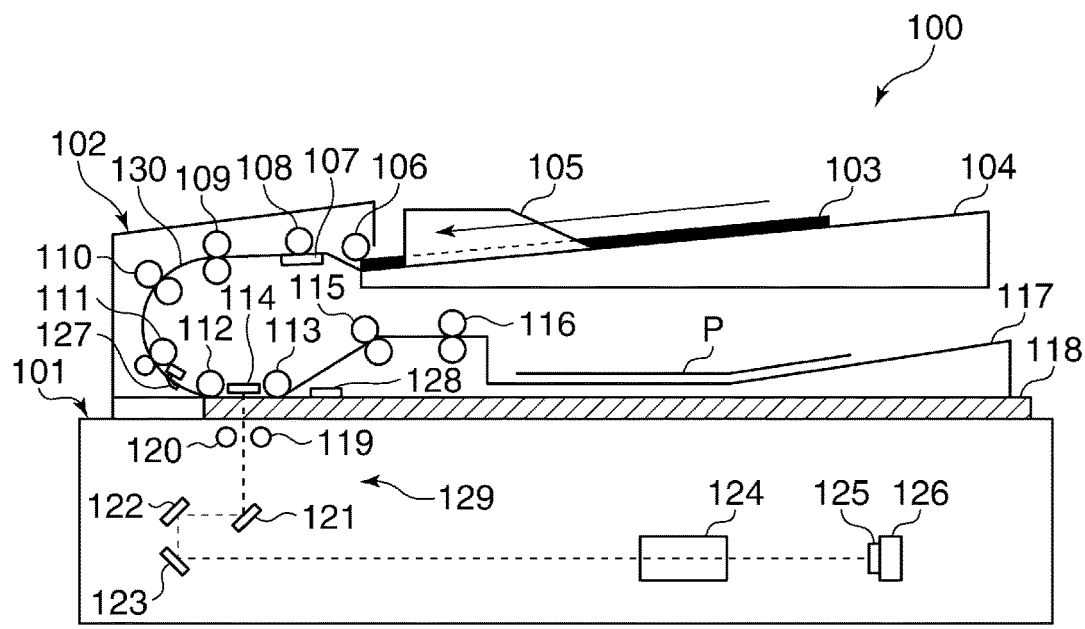
FIG. 1 is a sectional view schematically showing a configuration of an image reading apparatus according to an embodiment of the present invention.

FIG. 1 is a sectional view schematically showing a configuration of an image reading apparatus according to an embodiment of the present invention. The image reading apparatus 100 mainly consists of an image reading section 101 and an ADF (automatic document feeder) 102 that is placed on the image reading section 101. This image reading apparatus 100 may be arranged in an upper portion of an image forming apparatus so as to constitute a part of the image forming apparatus concerned.

As shown in FIG. 1, the ADF 102 is provided with an original tray 104, a pickup roller 106 disposed above the original tray 104 at an end in a feeding direction, a curved conveyance path 130 as a feeding path, and a sheet ejection tray 117.

Width regulating plates 105 are provided at both sides of the original tray 104 in a width direction. The width regulating plates 105 regulate the sides of originals P that form an original bundle 103 in the width direction. A separation roller 108 is disposed at an entrance portion of the conveyance path 130. A separation pad 107 is opposite the separation roller 108. The separation roller 108 separates the uppermost original P that is conveyed by the pickup roller 106 from the original bundle 103 by collaborating with the separation pad 107.

In the downstream side of the separation roller 108 in the conveyance path 130, a first registration roller pair 109, second registration roller pair 110, first conveyance roller pair 111, second conveying roller 112, and third conveyance roller 113 are arranged in order along the conveyance direction of the original P. Moreover, a fourth conveyance roller pair 115 and ejecting roller pair 116 are arranged in order at the downstream side of the third conveyance roller 113.

An original detection sensor 127 is arranged in the conveyance path 130 at the downstream side of the first conveyance roller pair 111. The details of the original detection sensor 127 will be described later. Moreover, the section of the conveyance path 130 between the second conveying roller 112 and third conveyance roller 113 is located on an upper surface of a read glass 118 of the image reading section 101 mentioned later. And the section serves as an image reading position (hereinafter referred to as an "ADF read position") of the image reading section 101. A white guide member 114 is arranged above the conveyance path 130 so as to be opposite the ADF read position.

The image reading section 101 is arranged under the ADF 102, and the read glass 118 is arranged at the boundary with the ADF 102. A shading reference plate 128 is arranged at a position adjacent to the ADF read position on the read glass 118 through the third conveyance roller 113.

A scanner unit (read unit) 129 is arranged under the read glass 118 at the ADF read position. The read unit 129 is provided with lamps 119 and 120 as light sources, and a reflective mirror 121. Reflective mirrors 122 and 123 are arranged so as to be opposite the reflective mirror 121 of the read unit 129. An imaging lens 124 and a color line sensor 125 are arranged so as to be opposite the reflective mirrors 122 and 123. A signal processing substrate 126 is arranged so as to adjoin the color line sensor 125.

In the image reading apparatus 100 of such a configuration, the original bundle 103 is stacked on the original tray 104 of the ADF 102. The width regulating plates 105 are in contact with the sides of the original bundle 103 in the width direction to reduce skewed conveyance of the original P. The pickup roller 106 picks up the original P constituting the original bundle 103, and delivers it to a separating section. In the separating section, the separation pad 107 and the separation roller 108 collaborate so as to separate the uppermost original P of the original bundle 103.

The first registration roller pair 109 corrects the skewed conveyance of the separated original P. The original P of which the skewed conveyance was corrected is conveyed to the second registration roller pair 110, first conveyance roller pair 111, second conveying roller 112, and third conveyance roller 113. The fourth conveyance roller pair 115 and ejecting roller pair 116 convey the original that passed the third conveyance roller 113 and eject it to the sheet ejection tray 117.

The lamps 119 and 120 of the read unit 129 of the image reading section 101 irradiate the original P with light at the ADF read position between the second conveying roller 112 and third conveyance roller 113. The reflective mirrors 121, 122, and 123 reflect the reflected light from the original P so as to guide the light to the imaging lens 124. The white guide member 114 plays a role of giving pressure to the original so that the original does not separate and float from the read glass 118 when the original is conveyed through the ADF read position. Moreover, the white guide member 114 is used to determine whether dust adheres to the ADF read position on a basis of a read image that is obtained by scanning the white guide member 114 in a case where there is no original at the ADF read position.

The imaging lens 124 forms an image of the read original on the color line sensor 125 equipped with image pickup devices, such as CCDs, by refracting the reflected light. The color line sensor 125 is provided with three line sensors that detect color components R, G, and B, respectively, and converts an imaged light signal into an electrical signal. The signal processing substrate 126 converts the converted electrical signal into a digital signal, and obtains image data. The original detection sensor 127 arranged at the upstream side of the ADF read position detects the original P that is conveyed along the conveyance path 130, and the output signal thereof is used to control the reading start timing of the original P.

The shading reference plate 128 provided on the read glass 118 is applied to a shading correction. The color line sensor 125 has manufacturing variations among the pixels. And it is not easy to set up the lamps 119 and 120 so that the light amount is uniform throughout the scanning area. Accordingly, even if an original of a uniform density is read, digital values of image data read by the color line sensor 125 vary according to the scanning positions. Accordingly, the shading correction is performed using the shading reference plate 128 manufactured so that the density becomes uniform in a principal scanning direction. Specifically, the manufacturing variation and the variation of the light amount are corrected by correcting the digital signals so that luminance in the principal scanning direction are uniform as a predetermined digital value when the color line sensor 125 reads the shading reference plate 128 by a well-known method.

Figure 2:
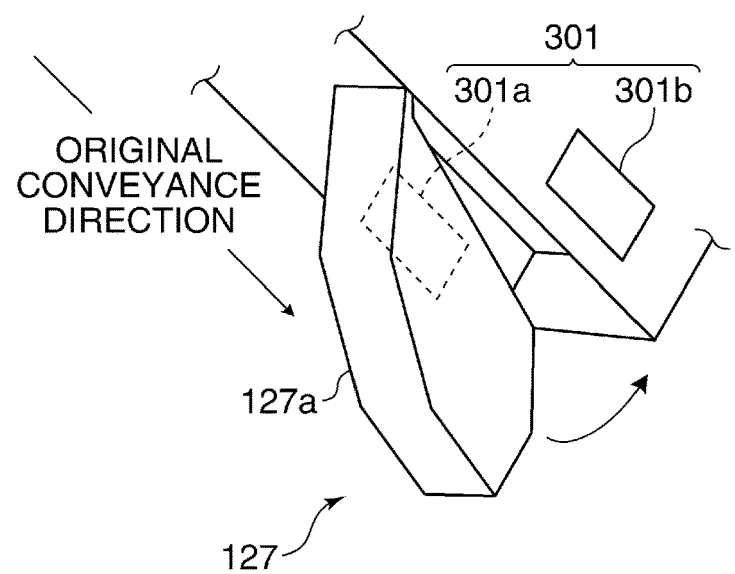
FIG. 2 is a perspective view schematically showing an original detection sensor in the image reading apparatus shown in FIG. 1.

FIG. 2 is a perspective view schematically showing the original detection sensor 127 in the image reading apparatus 100 shown in FIG. 1.

As shown in FIG. 2, the original detection sensor 127 is provided with an actuator 127a and a transmission sensor 301. When the original P that is conveyed along the conveyance path 130 is in contact with the actuator 127a, the actuator 127a is lifted in the conveyance direction of the original P. When the actuator 127a is lifted, an optical path between a light emitting section 301a and light receiving section 301b of the transmission sensor 301 is blocked. When the optical path between the light emitting section 301a and light receiving section 301b is blocked, a light amount of the light (infrared light, for example) that is emitted from the light emitting section 301a and is received by light receiving section 301b varies. Then, the variation of the received light amount is converted into the electrical signal, and it is detected that the original P reached the original detection sensor 127 on the basis of the variation of the voltage level of the electrical signal.

Next, the configuration of a control system of the image reading apparatus 100 shown in FIG. 1 will be described.

Figure 3:
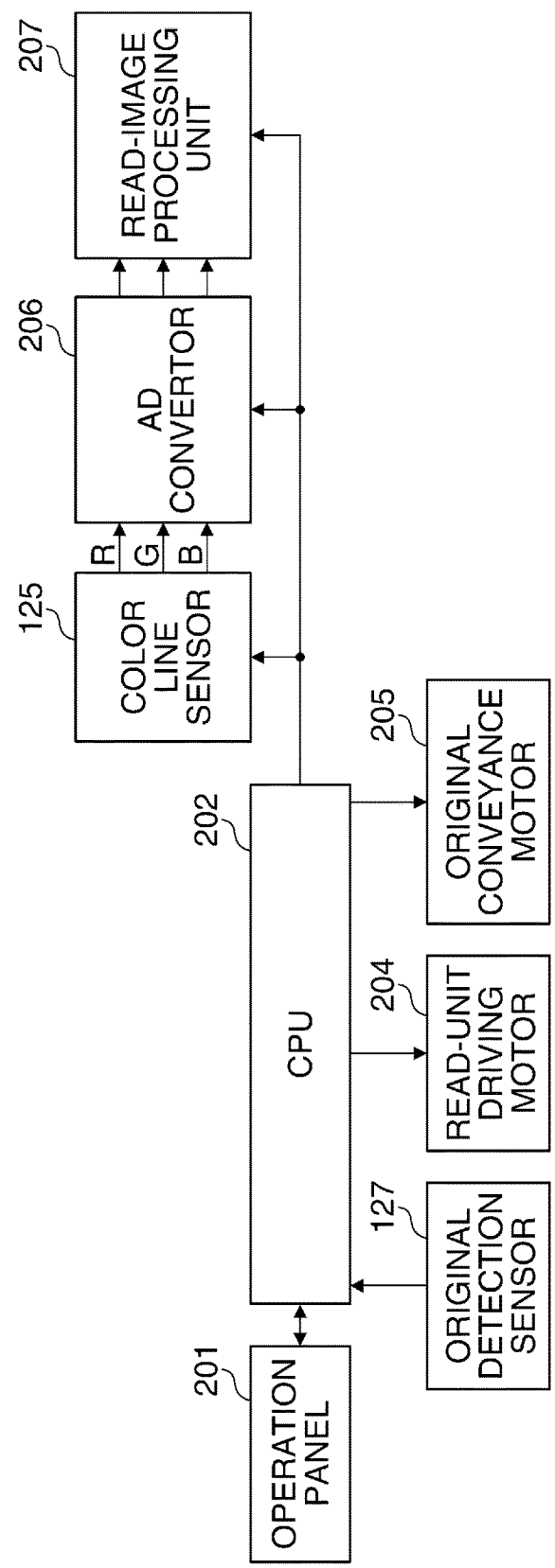
FIG. 3 is a block diagram schematically showing a control system of the image reading apparatus shown in FIG. 1.

FIG. 3 is a block diagram schematically showing a control system of the image reading apparatus shown in FIG. 1.

As shown in FIG. 3, the image reading apparatus 100 is provided with a CPU 202 that controls the entire image forming apparatus 100. The CPU 202 is connected with an operation panel 201, a read-unit driving motor 204, an original conveyance motor 205, an AD converter 206, a read-image processing unit 207, a color line sensor 125, and an original detection sensor 127.

The CPU 202 controls the AD converter 206 to convert the analog voltages of R, G, and B that are obtained by the color line sensor 125 into the digital values, for example. The digital values of the colors R, G, and B that were converted by the AD converter 206 are transmitted to a read-image processing unit 207.

Figure 4:
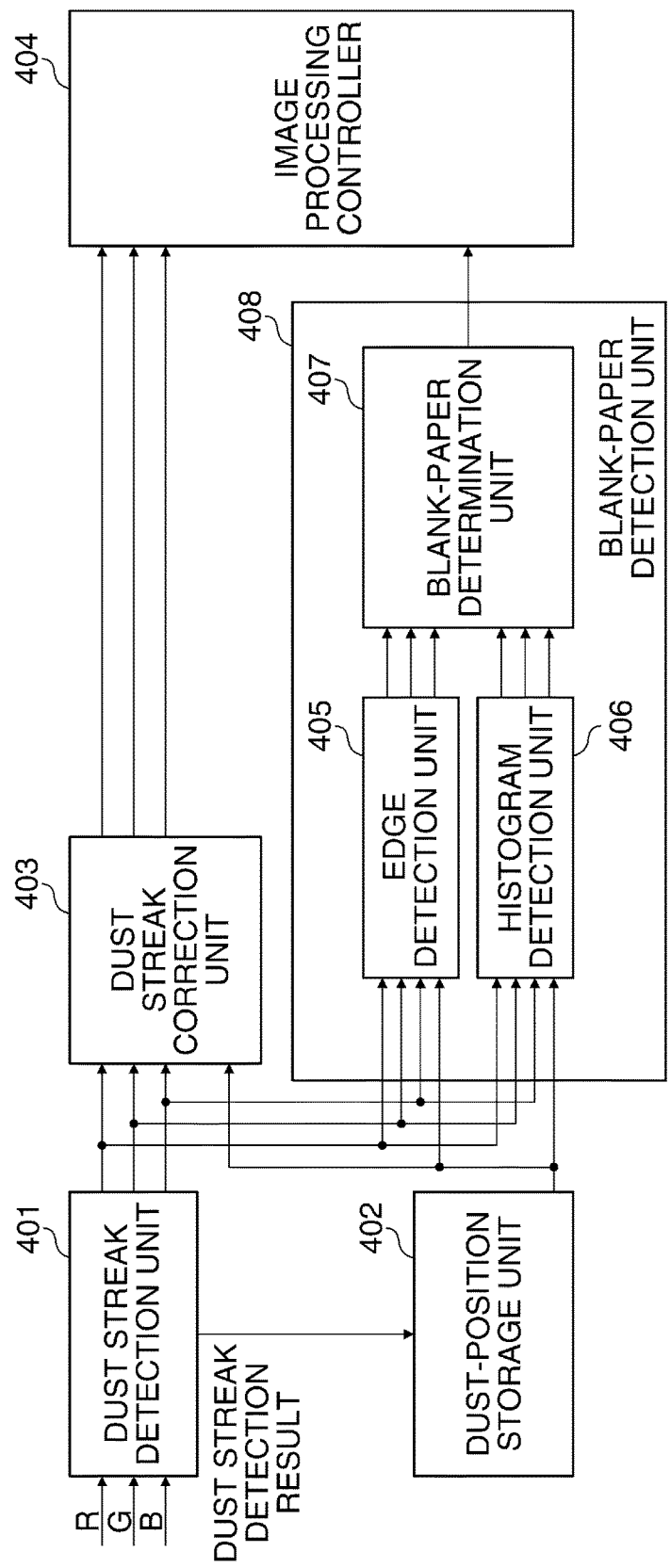
FIG. 4 is a block diagram showing a detail of a read image processing unit shown in FIG. 3.

FIG. 4 is a block diagram showing details of the read-image processing unit 207 shown in FIG. 3.

As shown in FIG. 4, the read-image processing unit 207 mainly consist of a dust streak detection unit 401, a dust-position storage unit 402, a dust streak correction unit 403, a blank-paper detection unit 408, and an image processing controller 404. The blank-paper detection unit 408 is provided with an edge detection unit 405, a histogram detection unit 406, and a blank-paper determination unit 407.

The dust streak detection unit 401 receives the signals of the colors R, G, and B that were obtained by the color line sensor 125 and were converted into the digital values by the AD converter 206 in FIG. 3. Then, the dust streak detection unit 401 detects a position on the read glass to which dust adheres at the time when the color line sensor 125 reads the white guide member 114. The dust streak detection unit 401 functions as an obtaining unit that obtains position information about the dust adhering to the ADF read position (dust-position information). The dust-position information is set up for each of the three line sensors constituting the color line sensor 125, and shows the adhesion position of the dust in the direction that intersects perpendicularly with the conveyance direction of the original P at the image reading position on the read glass 118.

The dust-position storage unit 402 stores the detection result of the dust adhesion position transmitted from the dust streak detection unit 401. The dust-position storage unit 402 transmits the information about the stored dust adhesion position to the dust streak correction unit 403 and blank-paper detection unit 408 concurrently with the start of the reading of an original. The dust streak correction unit 403 processes the image data corresponding to a target pixel on the basis of the dust-position information transmitted from the dust-position storage unit 402 and corrects the dust streak as a result.

Next, a blank-paper determination process performed with the image reading apparatus 100 in FIG. 1 will be described.

Figure 5A:
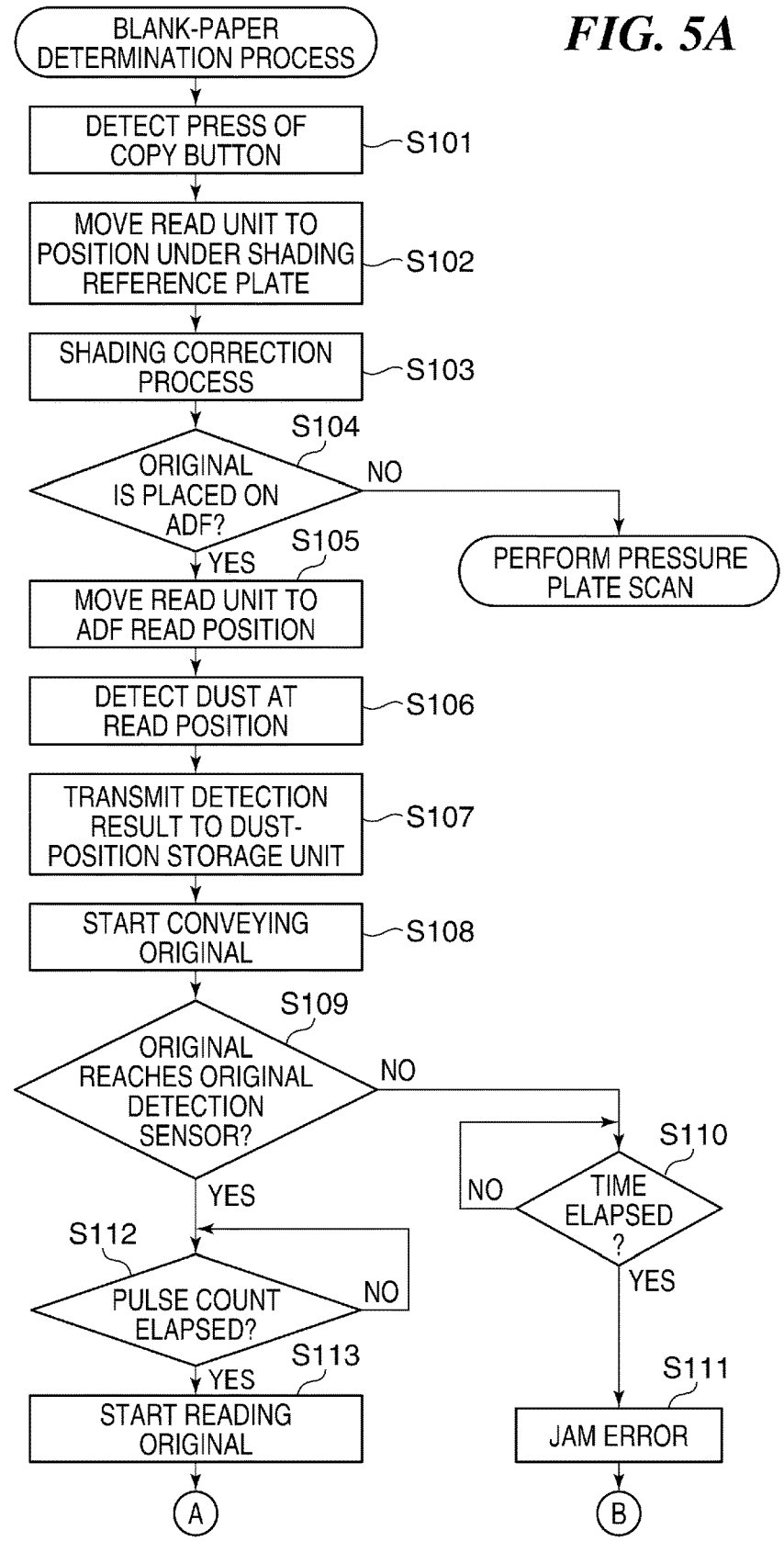
FIG. 5A and FIG. 5B are flowcharts showing procedures of a blank-paper determination process executed by the image reading apparatus shown in FIG. 1.
Figure 5B:
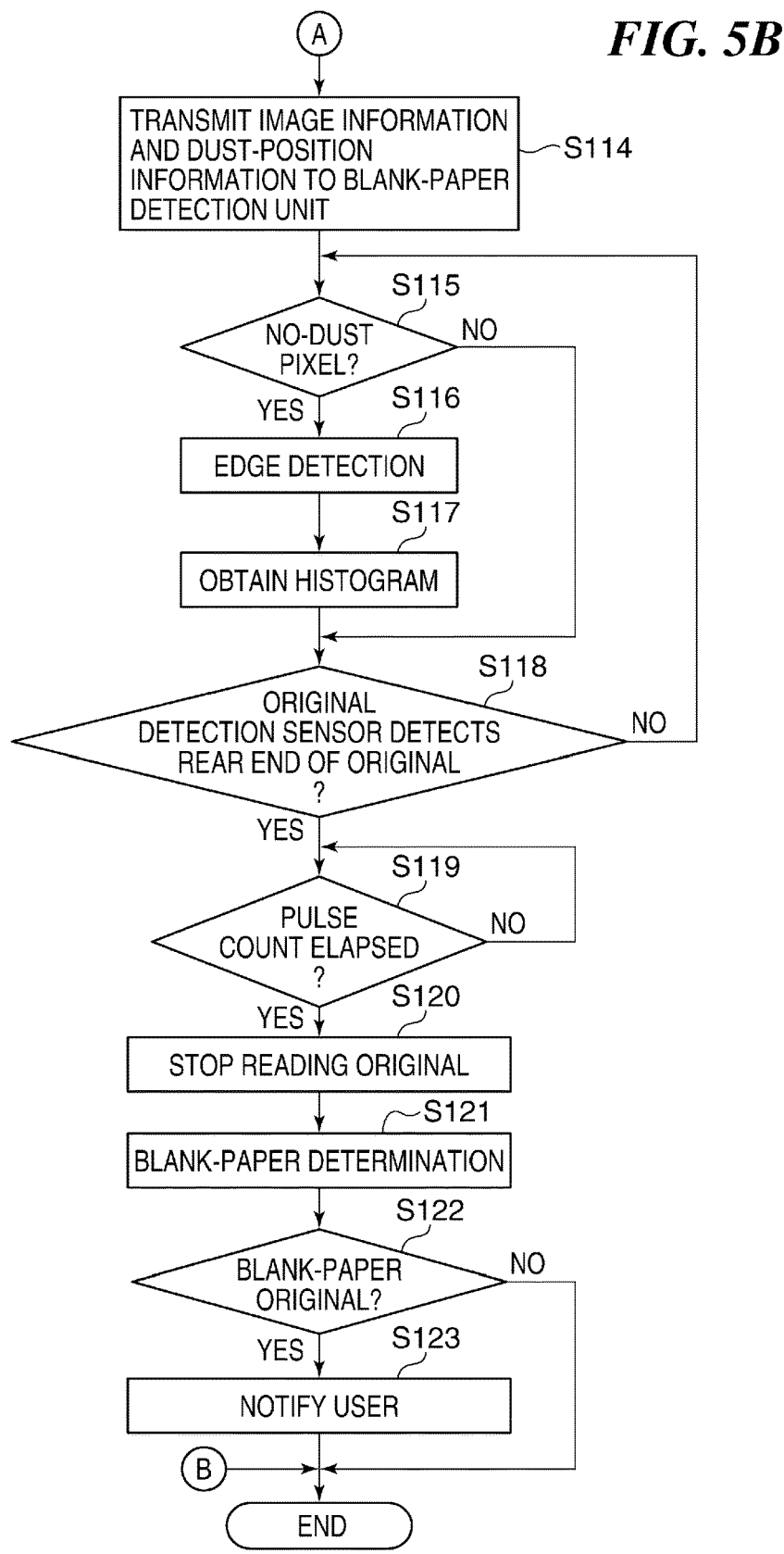

FIG. 5A and FIG. 5B are flowcharts showing procedures of the blank-paper determination process executed by the image reading apparatus 100 shown in FIG. 1. The CPU 202 of the image reading apparatus 100 performs the blank-paper determination process according to a blank-paper determination program stored in a ROM (not shown).

As shown in FIG. 5A, the blank-paper determination process starts when a user presses a copy button of the operation panel 201. That is, when the user stacks the original bundle 103 on the original tray 104 of the image reading apparatus 100 and presses the copy button of the operation panel 201, the CPU 202 detects that the user pressed the copy button (step S101).

Next, the CPU 202 drives the read-unit driving motor 204 to move the read unit 129 to the position under the shading reference plate 128 (step S102). After the read unit 129 arrives to the position under the shading reference plate 128, the CPU 202 lights the lamps 119 and 120, and performs the shading correction process (step S103).

In the shading correction process, the analog image signals corresponding to the light amounts of the colors R, G, and B obtained by the color line sensor 125 are transmitted to the AD converter 206. The AD converter 206 converts the obtained analog signals into the digital signals, and transmits them to the read-image processing unit 207. The read-image processing unit 207 corrects the shading so that the digital values of the image data obtained by reading the shading reference plate 128 corresponding to the pixels of the color line sensor 125 become approximately the same. As a result of this, the white levels become flat.

Next, the CPU 202 determines whether the original P is placed on the original tray 104 of the ADF 102 on the basis of the signal from the original detection sensor (not shown) that is provided on the original tray 104 (step S104). As a result of the determination in the step S104, when the original P is placed on the original tray 104 ("YES" in the step S104), the CPU 202 controls the read-unit driving motor 204 to move the read unit 129 to the ADF read position (step S105).

After moving the read unit 129 to the ADF read position (step S105), the CPU 202 controls the read unit 129 to read the white guide member 114, and detects the dust adhering at the ADF read position on the read glass 118 (step S106).

The dust adhering at the ADF read position is detected before starting conveyance of the original. That is, the lamps 119 and 120 irradiate the white guide member 114 with light, and the reflected light reflected by the white guide member 114 is received by the color line sensor 125, and the dust streak detection unit 401 of the read-image processing unit 207 determines the position of the dust adhering on the read glass based on the received light amounts.

Figure 6:
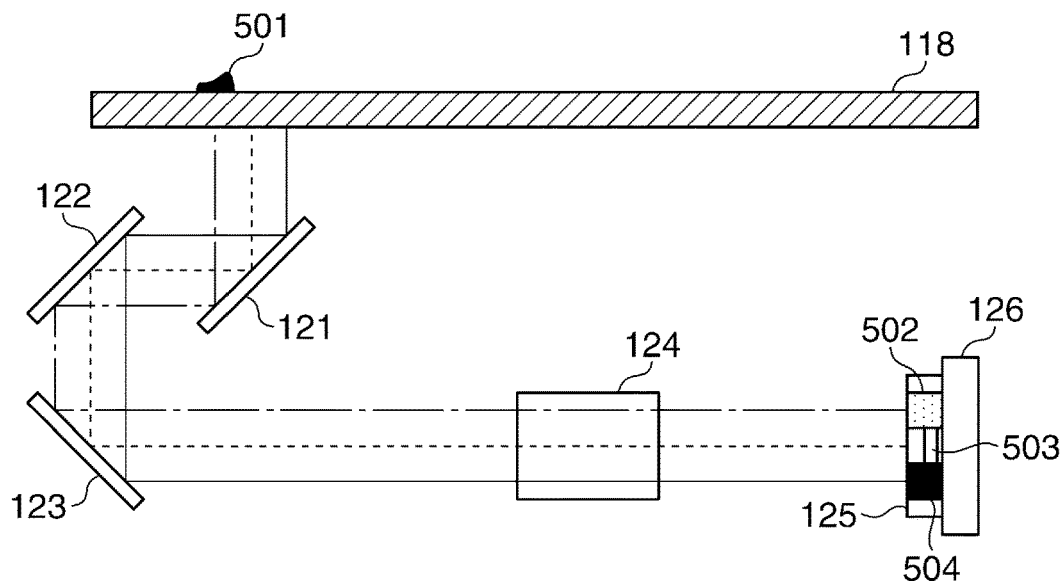
FIG. 6 is a sectional view showing dust adhering to an ADF read position and a color line sensor of the image reading apparatus shown in FIG. 1.

FIG. 6 is a sectional view showing dust adhering to the ADF read position and a color line sensor of the shown in FIG. 1.

As shown in FIG. 6, the color line sensor 125 is provided with three line sensors including a Red sensor 502, Green sensor 503, and Blue sensor 504. The reflected light reflected by the white guide member 114 enters into the imaging lens 124 through the reflective mirrors 121, 122, and 123, and forms an image on each line sensor with the image formation lens 124. In the example shown in FIG. 6, the dust 501 adheres to the position corresponding to the read position of the Red sensor 502 of the color line sensor 125, and no dust adheres to the positions corresponding to the read positions of the Green sensor 503 and Blue sensor 504.

The optical path of the reflected light that is received by the Red sensor 502 is indicated by an alternate long-and-short dash line in FIG. 6. The optical path of the reflected light that is received by the Green sensor 503 is indicated by a broken line in FIG. 6. And the optical path of the reflected light that is received by the Blue sensor 504 is indicated by a solid line in FIG. 6. A part of the reflected light that is received by the Red sensor 502 is blocked with the dust 501.

Figure 7:
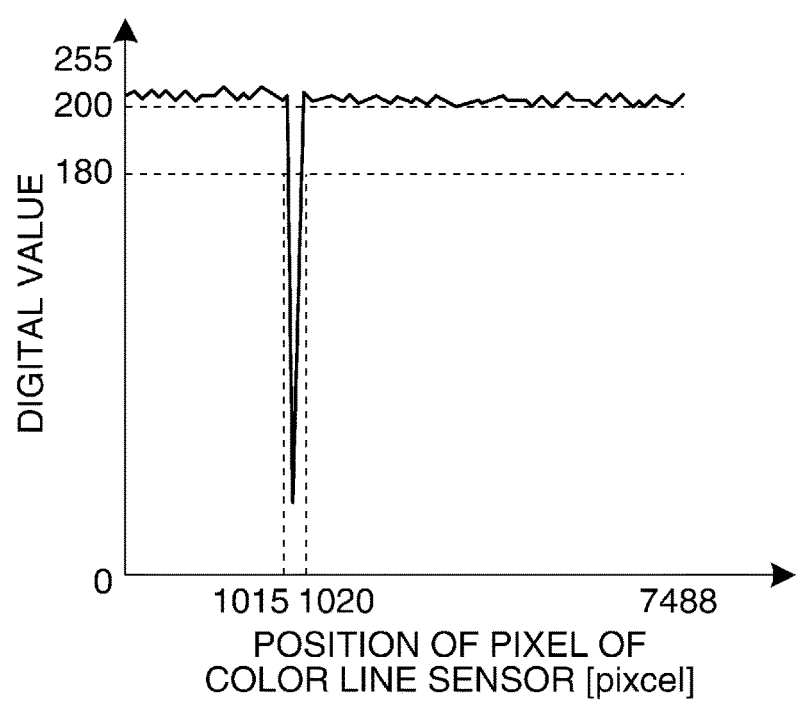
FIG. 7 is a graph showing an output value in each position of the color line sensor in a principal scanning direction in a case where dust adheres to the ADF read position of the image reading apparatus shown in FIG. 1.

FIG. 7 is a view showing output values of the color line sensor 125 in the principal scanning direction in a case where the dust adheres to the ADF read position. The width direction that intersects perpendicularly with the conveyance direction of the original P at the ADF read position is called the principal scanning direction, and the conveyance direction of the original P that intersects perpendicularly with the principal scanning direction is called an auxiliary scanning direction. The horizontal axis in FIG. 7 indicates a pixel position of the color line sensor 125 in the principal scanning direction. The vertical axis in FIG. 7 indicates the output value of each pixel (digital value of read image data).

When the resolution of the AD converter 206 of the signal processing substrate 126 that is arranged adjacent to the color line sensor 125 is 8 bits, the digital value that is obtained by AD-converting the analog voltage output from the color line sensor 125 falls within a range from 0 to 255.

The digital values that are obtained by reading the white guide member 114 become approximately flat after the shading correction. On the other hand, when dust adheres to the read glass 118 at the ADF read position, the digital value decreases at the dust position because the dust obstructs the reflection of the irradiated light from the lamps 119 and 120. Accordingly, when a digital value of a pixel obtained by reading the white guide member 114 is smaller than a certain threshold, it is determined that dust adheres to the position corresponding to the pixel.

In FIG. 7, when the digital value obtained by reading the white guide member 114 is about 200. Accordingly, when the threshold is set to 180, for example, it is determined that there is dust at the position corresponding to a pixel of which a digital value is lower than 180. That is, it is determined that there is dust at the position corresponding to the pixels 1015 through 1020 in FIG. 7.

Returning back to FIG. 5A, after detecting the dust adhering to the ADF read position (step S106), the CPU 202 proceeds with the process to step S107. That is, when a dust detection result is fixed, the CPU 202 transmits the dust-position information as the dust detection result to the dust-position storage unit 402 by controlling the dust streak detection unit 401 of the read-image processing unit 207 (step S107). The dust-position storage unit 402 stores the dust-position information transmitted. At this time, the dust-position information is transmitted also to the dust streak correction unit 403.

Hereinafter, an image process (dust streak correction) performed by the dust streak correction unit 403 will be described.

Figure 8:
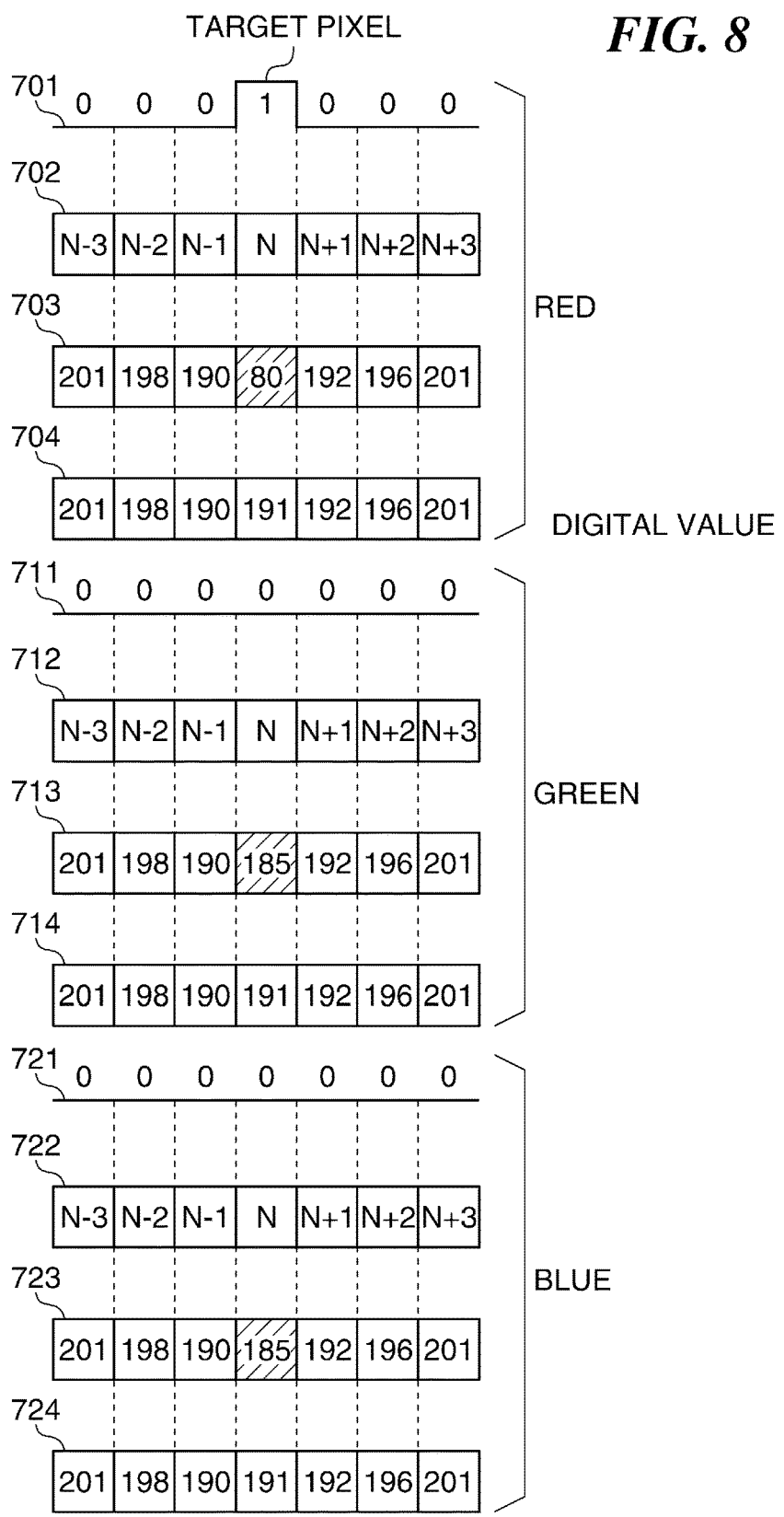
FIG. 8 is a view showing digital values of sensors constituting the color line sensor shown in FIG. 6 before and after dust streak correction.

FIG. 8 is a view showing the digital values of the sensors constituting the color line sensor 125 before and after the dust streak correction (hereinafter, referred to as a "digital value", simply).

As shown in FIG. 8, the dust information "1" is stored for a pixel that is determined that dust adheres, and the dust information "0" is stored for a pixel that is determined that dust does not adhere for every pixel of the Red sensor, Green sensor, and Blue sensor (see reference numerals 701, 711, and 721). This shows the pixel corresponding to the position to which dust adheres. The dust streak correction is performed on the basis of this dust-position information. reference numerals 702, 712, and 722 indicate numbers about pixels around the target pixel (number N) in the read images that are read by the Red sensor 502, Green sensor 503, and Blue sensor 504, respectively. Reference numerals 703, 713, and 723 indicate the digital values of the pixels of the read images, and reference numerals 704, 714, and 724 indicate the digital values of the pixels in the corrected images that are corrected by the dust streak correction process.

As shown by the reference numeral 701 in FIG. 8, the dust information of the target pixel (number N) in the Red sensor is "1", which shows that dust adheres to the position corresponding to the target pixel. On the other hand, the dust information of the pixels (numbers N−3, N−2, N−1, N+1, N+2, and N+3) around the target pixel is 0, which shows that dust does not adhere to the positions corresponding to these pixels. Moreover, as shown by the reference numeral 703, the digital value of the target pixel corresponding to the position at which the dust adheres is 80 level that is smaller than the digital values of the circumferential pixels.

The dust streak correction unit 403 specifies the pixel corresponding to the position to which the dust adheres on the basis of the dust position information 701 transmitted from the dust-position storage unit 402. Next, the dust streak is removed by linearly interpolating the digital value of the pixel corresponding to the dust position of the read image data to the specified pixel with reference to the digital values of the adjacent pixels on both sides of the specified pixel.

In the example of the Red sensor, the digital values of the pixels N−1 and N+1 that are adjacent to the target pixel corresponding to the dust position are 190 level and 192 level, respectively.

The digital value of the target pixel shall be D[N], the digital value of the adjacent pixel at the left side of the target pixel shall be D[N−1], the digital value of the adjacent pixel at the right side of the target pixel shall be D[N+1], and the corrected digital value of the target pixel after the linear interpolation shall be D[N]'. Then, when the digital value of the target pixel is linearly interpolated on the basis of the image information about the adjacent pixels on both sides, the corrected digital value D[N]' of the target pixel after the linear interpolation is shown by the following formula.

$$D[N]' = D[N-1] + (D[N+1] - D[N-1])/2$$
$$= 190 + (192 - 190)/2 = 191$$

Accordingly, the corrected digital value D[N]' of the target pixel after the linear interpolation becomes 191 as shown by the reference numeral 704 in FIG. 8. Accordingly, the dust streak correction is completed by converting the pre-correction digital value 80 of the target pixel into 191.

Thus, the dust streak correction process is performed by the dust streak correction unit 403 to the pixel that causes the dust streak. It should be noted that the dust streak correction unit 403 performs the dust streak correction process to the image data obtained by the Green sensor 503 and Blue sensor 504 even when dust adheres to the read position of the Red sensor 502 only. Hereinafter, the reason will be described.

Figure 9:
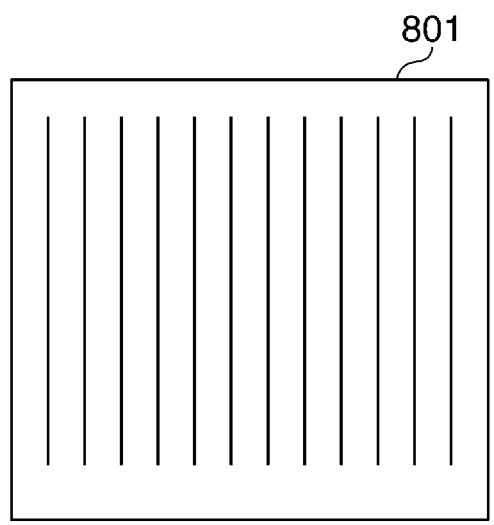
FIG. 9 is a view showing an original on which thin lines are printed.
Figure 10:
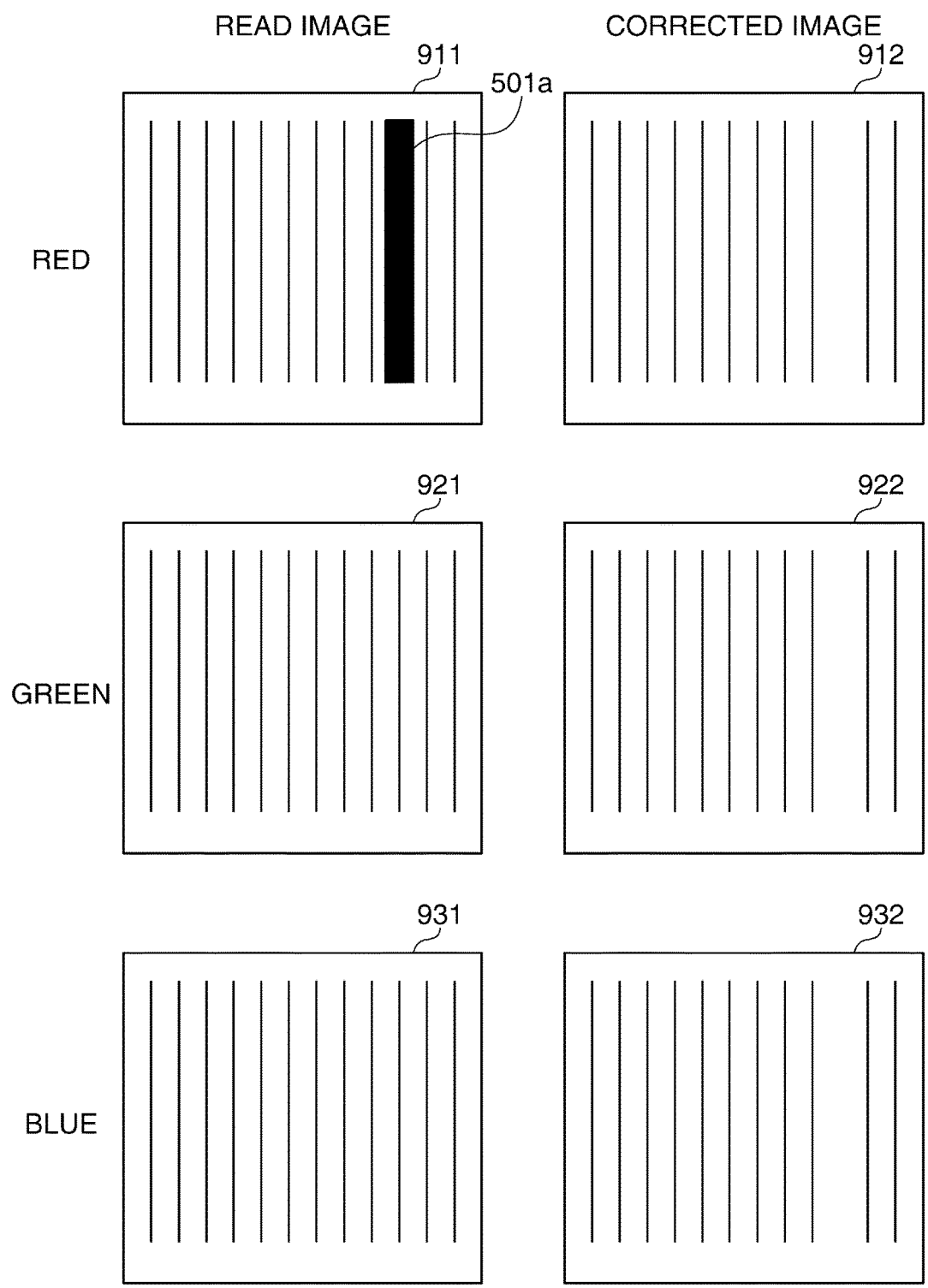
FIG. 10 is a view showing read images of respective color components obtained by reading the original shown in FIG. 9 in a state where dust adheres to the ADF read position of the image reading apparatus shown in FIG. 1, and corrected images after the dust streak correction.

FIG. 9 is a view showing an original 801 on which black thin lines are printed. FIG. 10 is a view showing read images of respective color components obtained by reading the original 801 shown in FIG. 9 in a state where dust adheres to the ADF read position of the Red sensor 502, and corrected images after the dust streak correction. In FIG. 10, reference numerals 911, 921, 931 show the read image read by the Red sensor 502, Green sensor 503, and Blue sensor 504, respectively. The reference numerals 912, 922, and 932 show the corrected image obtained by applying the dust streak correction to the read image 911, 921, and 931, respectively.

As shown in FIG. 10, a dust streak 501a due to the dust 501 appears in the read image 911 that is obtained by reading the original 801 on which the thin lines are printed as shown in FIG. 9 by the Red sensor 502. Since no dust adheres to the read positions of the Green sensor 503 and Blue sensor 504, no dust streak appears in the read images 921 and 931.

When dust adheres to a read position, a digital value of a pixel corresponding to the dust position becomes lower as shown in FIG. 7 mentioned above. Then, when the dust streak correction unit 403 corrects the dust streak 501a in the read image 911 read by the Red sensor 502 to which the dust adheres at the corresponding position, the dust streak 501a disappears as shown in the corrected image 912, but the thin line in the original 801 is also removed.

If the dust streak correction is applied to the read image 911 by the Red sensor 502 only, the third thin line from the right in the original 801 will be removed in the corrected image 921 but will remain in the corrected images corresponding to the read images 921 and 931. If these corrected images are composited, the color information about the third line from the right will be converted into a chromatic color from an achromatic color (black), because this line will be reproduced by the B component and G component.

In general, an image reading apparatus is provided with an ACS (Auto Color Selection) function that determines whether a content of an original is printed in an achromatic color or a chromatic color. The ACS function determines that the original is a color original when the content of the original is printed in a chromatic color, and determines that the original is a monochrome original when the content of the original is printed in an achromatic color. When the ACS function is installed, the image reading apparatus automatically distinguishes whether the original is a color original or a monochrome original even if the user does not designate a color mode or a monochrome mode.

In a case where an image reading device is provided with the ACS function, if the dust streak correction is performed only about a specific color image (the read image of the Red sensor 502, for example) as mentioned above, a monochrome original may be determined as a color original because a achromatic color is converted into a achromatic color.

Accordingly, even when the dust adheres to the read position of the Red sensor 501 only, the dust streak correction unit 403 applies the dust streak correction to the areas corresponding to the dust position in all the read images 911, 921, and 931 that are respectively read by the Red sensor 502, Green sensor 503, and Blue sensor 504.

The target pixels [N] in FIG. 8 mentioned above correspond to the positions of the third thin line from the right in the read images 911, 921, and 931, and the pre-correction digital values D[n] of the target pixels of the respective sensors are 80, 185, and 185. The post-correction digital values D[N]' are calculated by the linear interpolation using the digital values of the adjacent pixels according to the formula mentioned above, and become 191 in every color.

In addition to the linear interpolation of the read image by the Red sensor 502, the dust streak correction is performed by the linear interpolation for the read images by the Green sensor 503 and Blue sensor 504. This avoids the inconvenience that a print content varies from an achromatic color content to a chromatic color content due to removal of printing information of a specific color component only. The digital value that is linearly interpolated by the dust streak correction unit 403 is transmitted to the image processing controller 404 as the correction information.

Returning back to FIG. 5A, after transmitting the dust-position information as the dust detection result to the dust-position storage unit 402 (step S107), the CPU 202 controls the original conveyance motor 205 to start conveyance of the original P (step S108).

Next, the CPU 202 determines whether the front end of the original P reaches the original detection sensor 127 according to the output signal from the original detection sensor 127 concerned (step S109). As a result of the determination in the step S109, when the front end of the original P reaches the original detection sensor 127 ("YES" in the step S109), the CPU 202 waits until the number of conveyance pulses for the original conveyance motor 205 reaches a predetermined pulse count (step S112).

The predetermined pulse count is determined in consideration of a distance from the original detection sensor 127 to the ADF read position. Thus, the start timing of reading the original P is managed.

When the number of the conveyance pulses for the original conveyance motor 205 reaches the predetermined pulse count, the CPU 202 controls the read unit 129 to start reading the original P (step S113). After starting reading the original P (step S113), the CPU 202 controls the dust streak detection unit 401 and dust-position storage unit 402 to transmit the image information and dust-position information of R, G, and B components before the dust streak correction to the blank-paper detection unit 408 (step S114).

The reason why the image information before being corrected by the dust streak correction unit 403 is transmitted to the blank-paper detection unit 408 is as follows. This is because the post-correction printing information that was corrected by the dust streak correction unit 403 has lost the print contents, such as characters and lines, in an area corresponding to the dust streak position, and is not preferable as information used by the blank-paper detection.

Particularly, even when the dust adheres to only the read position of a sensor of a specific color (the Red sensor 501, for example), the dust streak correction is performed for images read by all the sensors including the Green sensor 503 and Blue sensor 504. In this case, print contents, such as characters and lines, within areas corresponding to the dust position in images read by the Green sensor 503 and Blue sensor 504 are erased even if they are printed. As a result, since the blank-paper detection will be performed on the basis of the information after the printing contents read by the Green sensor 503 and Blue sensor 504 are removed, an original including print contents may be erroneously determined as a blank-paper original. Accordingly, the image information of R, G, and B components before the dust streak correction is transmitted to the blank-paper detection unit 408 that performs the blank-paper determination.

After transmitting the dust-position information and image information to the blank-paper detection unit 408, the CPU 202 proceeds with the process to step S115. Namely, the CPU 202 controls the blank-paper detection unit 408 on the basis of the dust-position information received from the dust-position storage unit 402 to determine whether a pixel is not affected by dust (hereinafter, referred to as a no-dust pixel) for all the pixels of the images that have been detected by the sensors of R, G, and B components in the step S115.

As a result of the determination in the step S115, when determining that the pixel is a no-dust pixel ("YES" in the step S115), the CPU 202 performs edge detection using the image information about the no-dust pixel (step S116). The image information about the no-dust pixels is the image data read by the color line sensor 125, and is the image information obtained by removing the image data of pixels affected by the dust from the image data corresponding to the Red, Green, and Blue sensors.

Moreover, the edge means a changing point at which the digital value of the read image data received by the color line sensor 125 varies significantly. When there is a print content, such as a character or a line, in the original image, the edge detection unit 405 detects an edge. On the other hand, no edge is detected in an original that does not include a print content because there is no print content of which a digital value varies significantly as compared with a digital value of a ground of the original. Accordingly, the original in which no edge is detected is determined as a blank-paper original.

However, when an original that includes colored fibers, such as recycled paper, is read, an original that includes no print content may not be determined as a blank-paper original because the colored fibers may be detected as edges. Accordingly, an original is divided into latticed blocks, the number of edges is found for every block, and the blank-paper determination of the original is performed on the basis of dispersion of the number of edges in the embodiment.

Figure 11:
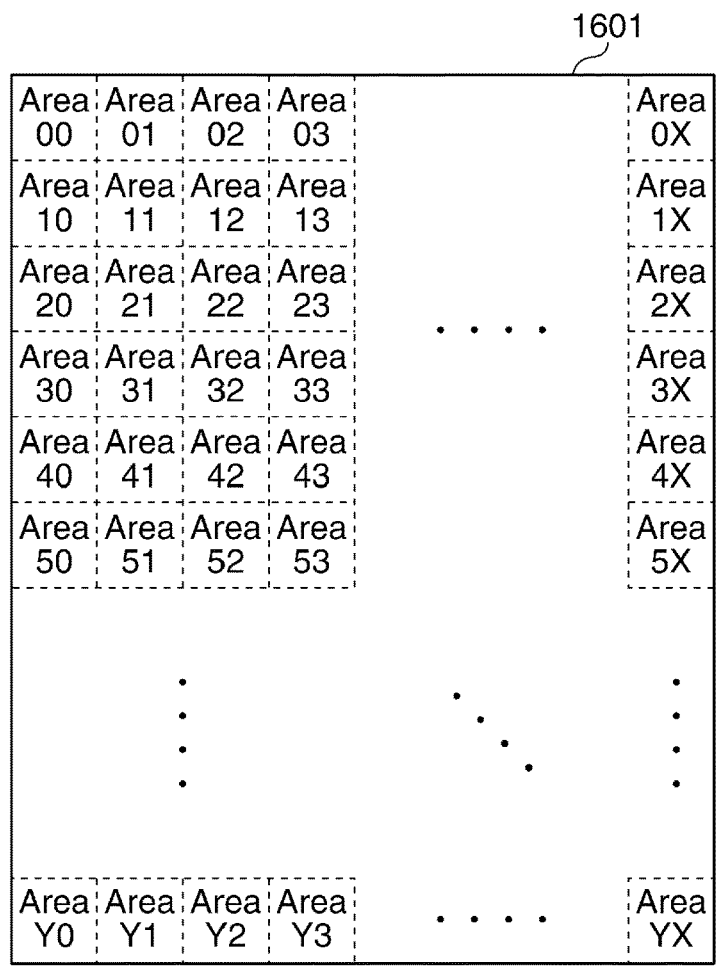
FIG. 11 is a view showing an original of which an image area is divided into blocks in a horizontal direction and a vertical direction.

FIG. 11 is a view showing an original of which an image area is divided into latticed blocks.

As shown in FIG. 11, an image area of an original 1601 is divided into a plurality of division blocks in a horizontal direction and a vertical direction.

The image area is divided into blocks Area 0X, Area 1X, Area 2X, ..., Area YX in the horizontal direction and blocks Area Y0, Area Y1, Area Y2, ..., Area YX in the vertical direction, and edges are detected from image data of each block. An edge is detected using a difference between a digital value (data value) of a target pixel and a digital value of an adjacent pixel in the read image data.

Figure 12:
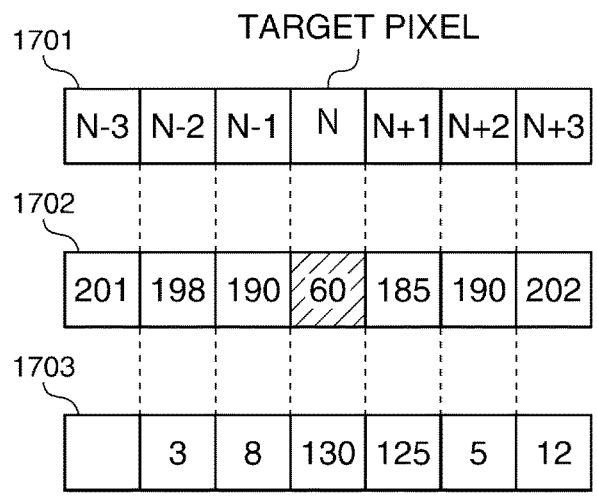
FIG. 12 is a view showing differences of digital values between a target pixel and adjacent pixels.

FIG. 12 is a view showing differences of digital values between a target pixel and adjacent pixels. It should be noted that a reference numeral 170 indicates pixel numbers of a target pixel (number N) and peripheral pixels, a reference numeral 1702 indicate digital values of the pixels, and a reference numeral 1703 indicates differences between digital values of adjacent pixels. When the original is a white original and there is a print content of which density is deeper than that of a ground of the original at the target pixel, the digital value 1702 of the target pixel becomes lower than the digital values of the adjacent pixels.

When the difference between the digital value of the target pixel and that of the adjacent pixel at the left is computed, the difference at the pixel corresponding to the print content becomes large as shown by the reference numeral 1703. Accordingly, it is determined that there is an edge at the pixel of which the difference is more than a threshold. This enables the edge detection.

It should be noted that a dust streak in a read image may be determined as an edge when the edge detection is performed for a read image before the correction. However, since the pixels affected by the dust were excluded from the object of the edge detection as mentioned above (the step S115), the dust streak is never detected as an edge of a print content erroneously.

Such an edge detection process is performed for each of the blocks Area 00 through Area XY in FIG. 11, and the blank-paper determination of an original is performed on the basis of the dispersion of the number of edges detected in every block.

Returning back to FIG. 5B, after completing the edge detection, the CPU 202 controls the histogram detection unit 406 to obtain a histogram from the digital values of the read image data with the no-dust pixels (step S117).

When no print content is included in the original, only one peak of the histogram of the digital values appears near the digital value corresponding to the ground color of the original. On the other hand, when a print content is included in the original, a plurality of peaks of the histogram of the digital values appear. The blank-paper determination unit 407 calculates the histogram (i.e., luminance distribution) for one original. The details of the blank-paper determination on the basis of the histogram determination will be mentioned later.

After obtaining the histogram, the CPU 202 determines whether the original detection sensor 127 detected the rear end of the original P (step S118). And the CPU 202 repeats the process in the steps S115 through S117 until the original detection sensor 127 detects the rear end of the original P.

After detecting the rear end of the original P by the original detection sensor 127, the CPU 202 determines whether the original conveyance motor 205 has been driven by the predetermined number of pulses after detecting the rear end of the original P (step S119). The CPU 202 waits until the number of pulses reaches the predetermined number. After driving the original conveyance motor 205 by the predetermined pulse counts, the CPU 202 stops reading the original (step S120), and controls the blank-paper determination unit 407 to perform the blank-paper determination (step S121).

The blank-paper determination unit 407 performs the blank-paper determination of the original P as follows.

The blank-paper determination on the basis of the edge detection will be described first. As a result of the edge detection process described with reference to FIG. 11 and FIG. 12, when the numbers of edges differ among the blocks and the dispersion of the number of edges is more than a predetermined threshold, it is determined that the original P is not a blank-paper original. On the other hand, even if the numbers of edges in the blocks are large, when the difference in the number of edges among the blocks is small and the dispersion is less than the threshold, it is determined that the original P is a blank-paper original. As a result of this, even if an original that includes colored fibers, such as recycled paper, is read, it is determined as a blank-paper original as long as there is no print content.

On the other hand, the blank-paper determination by a histogram determination is performed as follows. Namely, the calculated histogram is grouped at intervals of predetermined luminance, and it is determined whether a frequency of the peak of a histogram within a group is larger than a predetermined value, for every group. Then, when there are two or more groups within which a frequency of the peak of a histogram is larger than the predetermined value, it is determined that the original P includes a print content. On the other hand, when there is only one group within which a frequency of the peak of a histogram is larger than the predetermined value, it is determined that the original P is a blank-paper original.

Hereinafter, an example of the blank-paper determination will be described.

Figure 13A:
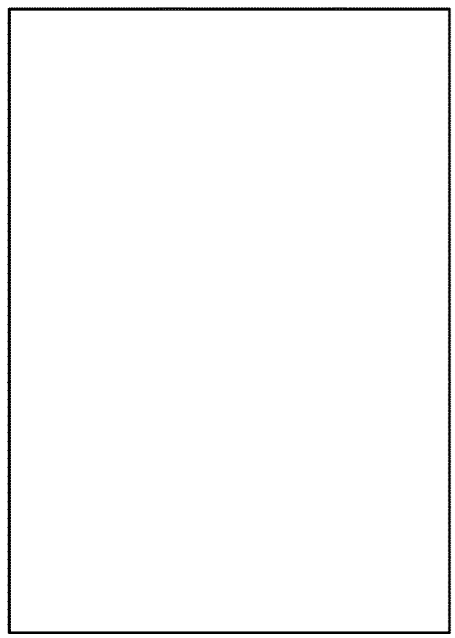
FIG. 13A is a view showing a read image of a blank-paper original.
Figure 13B:
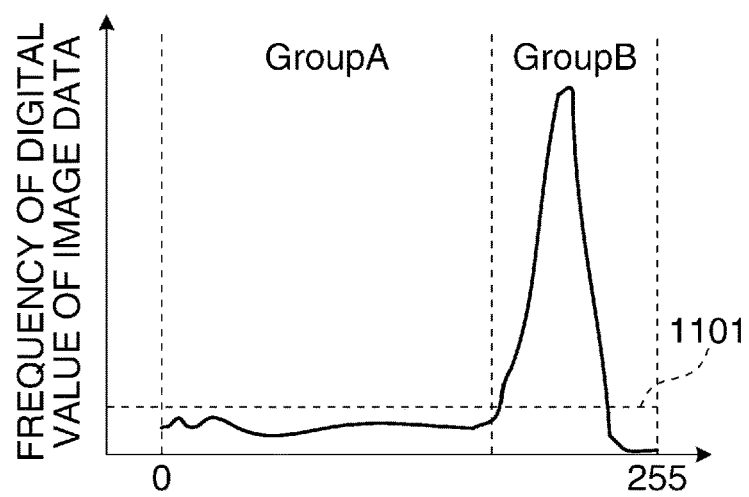
FIG. 13B is a graph showing a histogram of the read image shown in FIG. 13A.

FIG. 13A is a view showing a read image of a blank-paper original. FIG. 13B is a graph showing a histogram of the read image shown in FIG. 13A. FIG. 13B shows the histogram of the entire read image of a blank-paper original that includes no print content shown in FIG. 13A. It should be noted that the digital value, which is a luminance value of the image data, falls within a range of 0 through 255 in this case. The range is divided into a group A of which digital value falls within a range of 0 through 170 and a group B of which digital value falls within a range of 171 through 255, and the blank-paper determination is performed.

When an original includes no print content, a peak of a histogram appears at a high digital value as shown in the group B in FIG. 13B because the frequency of the digital value corresponding to the ground of the original becomes highest.

As shown in FIG. 13B, when only one of the groups A and B includes a digital value of which frequency exceeds a predetermined threshold 1101, it is determined that the original P is a blank-paper original.

Figure 14A:
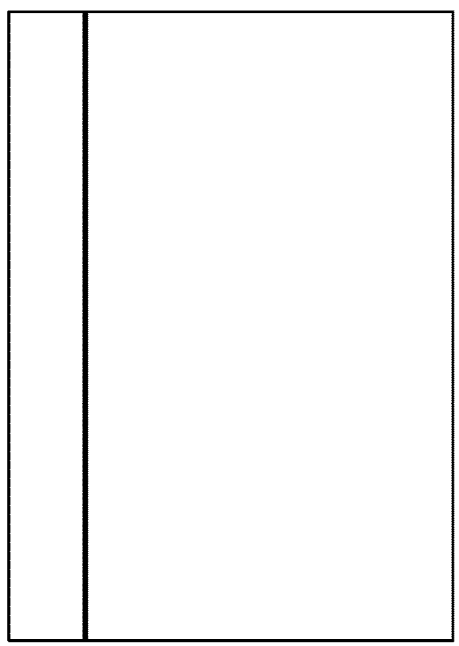
FIG. 14A is a view showing a read image in which a dust streak appears.
Figure 14B:
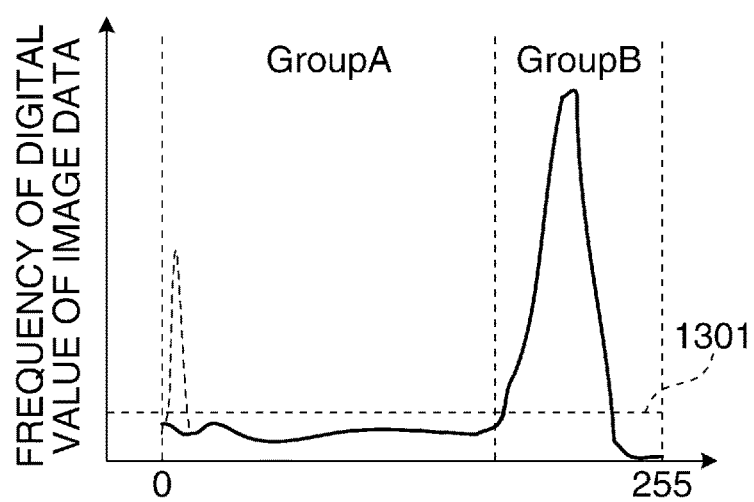
FIG. 14B is a graph showing a histogram of the read image shown in FIG. 14A.

Next, the blank-paper determination of an original in a case where a dust streak appears in a read image of the original will be described. FIG. 14A is a view showing a read image in which a dust streak appears. FIG. 14B is a view showing a histogram of the read image shown in FIG. 14A. FIG. 14B shows the histogram of the entire read image of a blank-paper original that includes no print content in a case where the dust streak appears as shown in FIG. 14A.

In the embodiment, when a dust streak appears in a read image, the area including the dust streak is excluded from the object area of the blank-paper determination as mentioned above (the step S115). That is, since the digital value corresponding to the dust streak (a peak shown by a broken line in FIG. 14B) is not reflected to the histogram, a peak of the histogram is not detected in the group A as shown in FIG. 14B. Accordingly, since only the group B includes a digital value of which frequency exceeds a predetermined threshold 1301, it is determined that the original P is a blank-paper original as with FIG. 13B mentioned above.

Next, the blank-paper determination of an original with a few print content in which only a page number is printed at a right lower corner will be described.

Figure 15A:
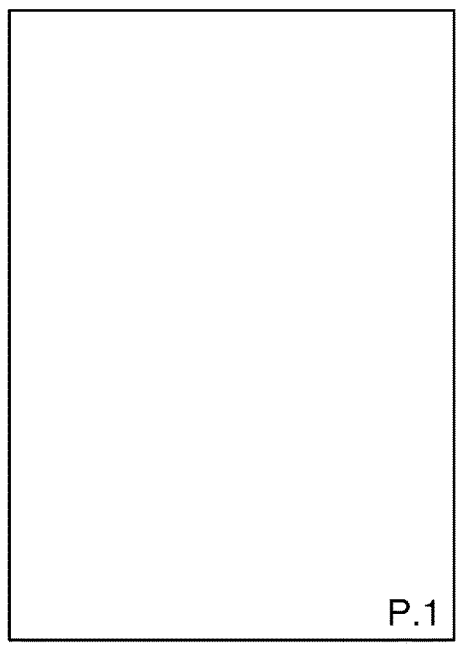
FIG. 15A is a view showing an original with a few print content in which only a page number is printed at a right lower corner.
Figure 15B:
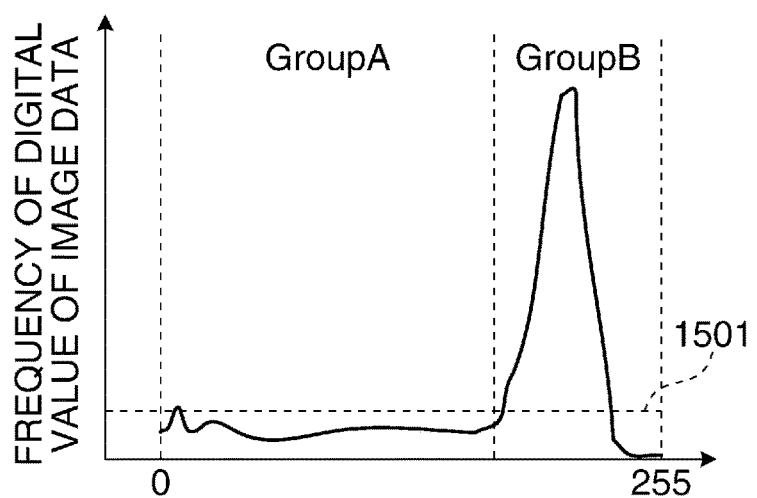
FIG. 15B is a graph showing a histogram of the read image of the original shown in FIG. 15A.

FIG. 15A is a view showing an original with a few print content in which only a page number is printed at a right lower corner. FIG. 15B is a view showing a histogram of the read image of the original shown in FIG. 15A. FIG. 15B shows the histogram of the entire read image of the original in which the page number is printed at the right lower corner shown in FIG. 15A.

Even if there is a few print content, a peak of the histogram appeared in the group A will be detectable using a threshold 1501, and the original P will be determined as a printed original in this case. Thus, since the histogram detection unit 406 detects a histogram on a basis of image data in which a dust streak was excluded when the dust streak appears at the time of reading an original on which a few print content like a character is printed, the blank-paper determination unit 407 avoids an erroneous detection risk.

Returning back to FIG. 5B, the CPU 202 controls the blank-paper determination unit 407 to perform a blank-paper determination about whether the original P is blank paper (step S122). At this time, the CPU 202 determines on the basis of the detection result of the edge detection unit 405 and the detection result of the histogram detection unit 406. When at least one of the detection results shows blank paper, it is determined that the original P is a blank-paper original. Then, the CPU 202 transmits the determination result to the image processing controller 404. On the other hand, when both the edge detection unit 405 and histogram detection unit 406 detect that the original is not a blank-paper original, the CPU 202 determines that the original P is not a blank-paper original, and finishes this process.

As a result of the determination in the step S122, when the original P is a blank-paper original ("YES" in the step S122), the CPU 202 proceeds with the process to step S123. That is, the CPU 202 controls the image processing controller 40 to notify the user that the original is a blank-paper original through the operation unit (step S123), and then, finishes this process. In a case where the image reading apparatus 100 is constituted as a part of an image forming apparatus, the CPU 202 instructs the image forming apparatus not to form a copy image about the blank-paper original.

On the other hand, as a result of the determination in the S104, when no original is placed on the original tray 104 ("NO" in the step S104), the CPU 202 performs pressure plate scan. Since a user usually determines whether an original is a blank-paper original when performing the pressure plate scan, the blank-paper determination is not performed.

Moreover, as a result of the determination in the step S109, when the original does not reach the original detection sensor 127 ("NO" in the step S109), the CPU 202 determines whether a predetermined time elapsed after starting conveyance of the original, and waits until the predetermined time elapses (step S110). When the original detection sensor 127 does not detect the original until the predetermined time elapses ("YES" in the step S110), it is considered that jam occurred during the conveyance of the original. Accordingly, the CPU 202 determines a jam error (step S111), and then, finishes this process.

Moreover, as a result of the determination in the step S115, when dust adheres to the target pixel ("NO" in the step S115), the CPU 202 proceeds with the process to the step S118, and repeats the process in the steps S115 through S117 until the original detection sensor 127 detects the rear end of the original P.

According to the process in FIG. 5A and FIG. 5B, the dust detection is performed for every pixel in the entire area of the line sensor 125 (step S106), and a dust streak is corrected by controlling the dust streak correction unit 403 when a dust streak is detected. On the other hand, in the steps S116 and S117, the original P is read, it is determined whether a pixel corresponds to a position where dust has adhered about each pixel of the read image, and the edge detection unit 405 and histogram detection unit 406 respectively detect an edge and a histogram on the basis of pixels that do not correspond to the position where dust has adhered. Then, when at least one of the edge detection result and histogram detection result shows the blank paper, it is determined that the original P is a blank-paper original. When both the edge detection result and histogram detection result do not show the blank paper, it is determined that the original P is not a blank-paper original. This enables the blank-paper detection of the original P without being affected by the dust adhering to the ADF read position, which improves accuracy of the blank-paper determination remarkably. Moreover, this enables to avoid the erroneous determination that erroneously determines a blank-paper original as a printed original because of confusing dust with a print content.

It should be noted that the embodiment may be modified to determine that the original P is a blank-paper original only when both the edge detection result and histogram detection result show the blank paper. Thus, the determination condition can be changed corresponding to the object.

Moreover, the dust-position information is detected only from the image information about the white guide member 114 in the embodiment. However, the dust-position information may be detected using both the image information about the white guide member 114 and the image information about the front end area of an original. When the dust-position information is detected only from the image information about the white guide member 114, a position of dust adhering to the white guide member 114 will also be detected as the dust-position information. However, the white guide member 114 hides behind an original while reading the original. That is, the dust adhering to the white guide member 114 does not affect the image information about the original. When the dust-position information is detected using both the image information about the white guide member 114 and the image information about the front end area of an original, the position of dust adhering to the white guide member 114 is not detected as the dust-position information, and only the position of dust adhering to the read glass 118 is detected as the dust-position information.

According to the embodiment, the blank-paper determination is performed at the time when the image of the original P is read, and the following process does not stop even if the original P is a blank-paper original. Accordingly, the blank-paper detection can be performed without stopping the reading operation, the copying operation, etc. When it is controlled so as not to perform the copying operation for a blank-paper original, wasteful copy operation is avoided and a paper sheet is saved.

Moreover, according to the embodiment, the dust streak correction is performed for all the three color sensors of the color line sensor 125 even when dust has adhered to a position corresponding to only one specific color sensor. This reduces the inconvenience that a print content varies from an achromatic color to a chromatic color due to removal of printing information of specific sensor information.

Moreover, the blank-paper determination is performed using the image data of the pixels where the dust streak is not corrected in the embodiment. As a result of this, when dust has adhered to a position corresponding to the read position of one specific color sensor among the Red sensor 502, Green sensor 503, and Blue sensor 504, only the image data of the specific color at the pixel with the dust streak is excluded from the blank-paper detection object. Accordingly, when a print content is included in pixels of color sensors corresponding to a dust streak, image data of a color sensor of which a read position has no dust actually is usable for the blank-paper determination without missing the print content.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-248350, filed Dec. 21, 2015, which is hereby incorporated by reference herein in its entirety.

What is claimed is:

1. An image reading apparatus comprising:
a conveyor configured to feed an original;
a guide member arranged corresponding to a read position;
a line sensor configured to read the original to output image data; and
a processor configured to execute a plurality of tasks, including:
a detecting task that detects dust-position information about dust adhering to the read position based on image data obtained by reading the guide member with the line sensor before reading the original;
a determining task that determines whether the original is a blank-paper original, using image data corresponding to dust-unaffected pixels obtained by excluding dust image data, corresponding to the dust-position information, from the image data output from the line sensor; and
a correcting task that corrects the dust image data corresponding to the dust-position information using the image data corresponding to the dust-unaffected pixels.

2. The image reading apparatus according to claim 1, wherein the dust-position information is position information in a width direction that intersects perpendicularly with a conveyance direction of the original by the conveyor.

3. The image reading apparatus according to claim 1, wherein the determining task detects information about an edge based on the image information corresponding to the dust-unaffected pixels a histogram of the image information corresponding to the dust-unaffected pixels.

4. The image reading apparatus according to claim 3, wherein the determining task divides the image information corresponding to the dust-unaffected pixels into a plurality of blocks, detects an edge of the image information for every block using a difference in the image information corresponding to the pixels, and determines whether the original is a blank-paper original according to dispersion of the number of edges detected.

5. The image reading apparatus according to claim 3, wherein determining task divides the histogram corresponding to the dust-unaffected pixels into a plurality of groups at intervals of predetermined luminance, and determines whether the original is a blank-paper original according to the number of groups within which a frequency of a peak of a histogram is larger than a predetermined threshold.

6. The image reading apparatus according to claim 3, wherein determining task determines that the original is a blank-paper original in a case where at least one of a detecting result about detecting an edge or a detecting result of a histogram.

7. The image reading apparatus according to claim 1, the correcting task removes an effect of the dust adhering at the read position.

8. The image reading apparatus according to claim 7, wherein the correction task removes the effect of the dust by correcting image information about a pixel corresponding to a position to which dust has adhered by linear interpolation using the image information about pixels around the pixel corresponding to the position to which dust has adhered.

9. An image forming apparatus equipped with an image reading apparatus, the image reading apparatus comprising:
   a conveyor configured to feed an original;
   a guide member arranged corresponding to a read position;
   a line sensor configured to read the original to output image data; and
   a processor configured to execute a plurality of tasks, including:
      a detecting task that detects dust-position information about dust adhering to the read position based on image data obtained by reading the guide member with the line sensor before reading the original;
      a determining task that determines whether the original is a blank-paper original, using image data corresponding to dust-unaffected pixels obtained by excluding dust image data, corresponding to the dust-position information, from the image output from the line sensors;
      a correcting task that corrects the dust image data corresponding to the dust-position information using the image data corresponding to the dust-unaffected pixels; and
      an image forming task that forms an image based on the corrected dust image data.

10. The image forming apparatus according to claim 9, wherein the image forming task:
   forms a copy image according to the image information obtained by reading an original; and
   does not form a copy image in a case where the original is a blank-paper original.

* * * * *